April 23, 1940.  F. L. PRUYN  2,197,770
FILTER BED CLEANING
Filed Nov. 2, 1938
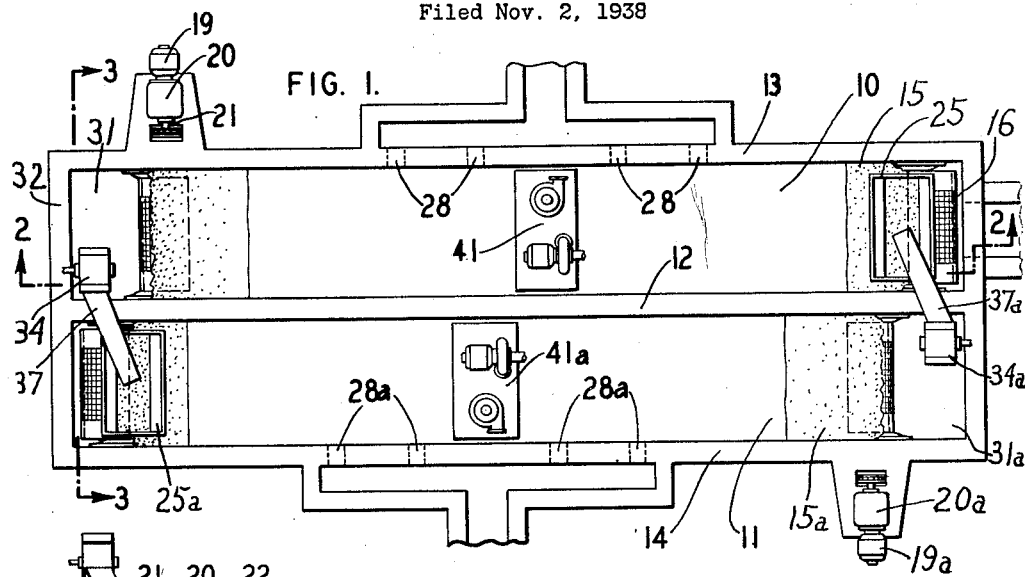
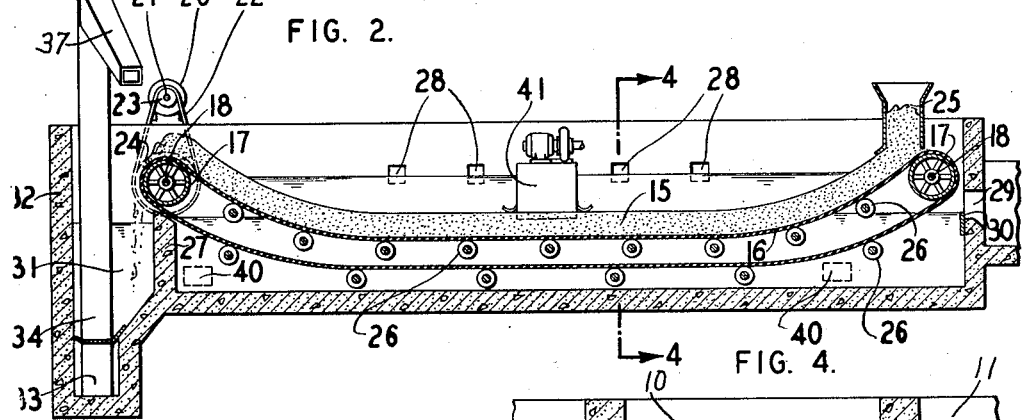
INVENTOR
FRANCIS L. PRUYN
BY Louis L. Ansart
his ATTORNEY Patented Apr. 23, 1940

2,197,770

UNITED STATES PATENT OFFICE 2,197,770

FILTER BED CLEANING

Francis L. Pruyn, Sea Girt, N. J.

Application November 2, 1938, Serial No. 238,322

5 Claims. (Cl. 210—128)

This invention relates to filtration of liquids and more particularly to filtration of liquids through beds of granular material such as sand.

An important object of the invention is to provide a novel and advantageous apparatus for the filtration of liquids through a filter bed of granular material. Another object is to provide a novel and advantageous method for effecting such filtration. A further object of the invention relates to the provision of filtration apparatus wherein the bed of granular material will be kept relatively clean so as to enable continuous filtration. Another object relates to the provision of novel apparatus in which a filter bed of granular material is moved across a stream of liquid to be filtered, clean granular material being supplied at one side of such stream and the granular material being withdrawn, after use for filtration, at the opposite side of the stream.

A further object of the invention is to provide apparatus in which a filter bed of granular material is moved transversely of a stream of liquid to be filtered, and contaminated granular material is not only cleaned but transferred to the other side of the stream for reuse in said filter bed. Another object of the invention is to provide apparatus in which the liquid to be filtered is fed to each of two traveling filter beds of granular material, granular material discharged from each bed after passing from the stream is transferred to the entrance end of the other bed, and impurities are removed from the granular material without interfering with continuous filtration. A further object is to provide apparatus in which a plurality of traveling filter beds may be used and the granular material used successively in the various beds and the granular material is cleaned to enable continuous operation.

According to one form of apparatus for carrying out the invention, there are two filter tanks arranged side by side and the liquid to be filtered is supplied to both of the tanks above traveling filter beds of granular material. Each of the filter beds may be supported by the upper reach of an endless screen of suitable mesh to prevent passage of the granular material therethrough. Each endless screen may pass around rotatable supporting members or drums located at opposite ends of the corresponding filter tank and with their upper parts above the normal level of liquid in the tank. The upper reach may be supported by rotatable members such as rollers so located that this reach sags to a substantial distance above said liquid water level so that the filter bed carried thereby may have its upper surface below the liquid level and the lower reach of the endless screen may be supported by rollers to keep it from dragging on the bottom of the tank.

At one end of each tank the granular material for the filter bed may be deposited on the upper reach of the traveling screen so as to provide a filter bed of sufficient thickness, and the granular material thus supplied to the upper reach of the endless screen will be carried down into the liquid and to the other end of the tank. In this travel the granular material will serve as a filter bed for the liquid supplied above the same. The liquid will pass down through the filter bed into the lower part of the filter tank and may be withdrawn therefrom in any suitable manner, a suitable difference in head, between the liquid in the upper part of the tank and the lower part being maintained.

During its travel along the tank, the granular material will become contaminated by the solids and impurities removed from the liquid as it passed through the filter bed, and the material thus contaminated will be discharged from the endless screen at the end of the filter tank remote from the supply. The contaminated granular material thus discharged falls into a pit or tank at that end of the main tank and after having been washed in this pit by water introduced therein in clean condition and removed therefrom loaded with the impurities washed from the granular material, may be returned to the other end of the filter tank for reuse.

Where two filter tanks are used side by side, however, the granular material cleaned at the discharge end of one of the filter tanks may be supplied in any suitable manner to the entrance end of the adjacent filter tank in which the endless screen travels in the opposite direction. The granular material, after being used in the second filter tank, is discharged and washed at the end of the second filter tank adjacent the supply end of the first filter tank and may be transferred thereto in any suitable manner. The filtered liquid may be withdrawn from the lower part of the second filter tank in any suitable manner. It will be seen that the arrangement just referred to provides efficient means for filtration and enables continuous use and reuse of the same granular material.

It should be understood that although apparatus comprising two tanks has been particularly referred to, the present invention may be applied to one tank only or to more than two. It should also be understood that the rate of contamination may be such that it will be unnecessary to move the filter beds continuously, intermittent movement being sufficient.

Cleaning of the granular material of a traveling filter bed may be effected by use of a stationary overhead cleaner which would clean material of the bed as the bed moves past the same. Such a cleaner might also be used to effect a preliminary cleaning before a final cleaning effected when the material is discharged out at the discharge end of the upper reach of the endless screen.

Other objects, features and advantages will appear upon onsideration of the following detailed description and of the drawing in which:

Fig. 1 is a plan view of an apparatus embodying one form of the invention;
Fig. 2 is a section on the line 2—2 of Fig. 1;
Fig. 3 is a section on the line 3—3 of Fig. 1; and
Fig. 4 is a section on the line 4—4 of Fig. 2.

The embodiment of the invention illustrated in the drawing comprises two filter tanks 10 and 11 arranged side by side and separated by a common inner wall 12, the tank 10 having an outer wall 13 and the tank 11 having an outer wall 14. The tanks 10 and 11 are relatively long and narrow and each of them is provided with a traveling filter bed 15 of suitable granular material such as sand. Each filter bed 15 may rest on the upper reach of an endless screen 16 supported at opposite ends of the tanks on suitable rotatable members or drums 17 mounted on shafts 18 of which the one at the discharge end is driven by any suitable means such as an electric motor 19 which, acting through a speed reducer 20, drives a shaft 21 and an endless flexible connecting member 22, in the form of a belt or sprocket chain, passing around a suitable driving member 23 on the shaft 21 and a suitable driven member 24 on the shaft 18. It will be apparent that the filter bed should travel slowly.

The granular material for the filter bed 15 is supplied to the upper reach of the screen 16 at one end in any suitable manner as by means of a hopper 25 and after use in the tank 10 is finally discharged from the screen at the end remote from the hopper 25. In order to maintain the filter bed so that liquid introduced into the tank 10 above the filter bed must pass through the granular material thereof, the rotatable members or drums 17 are so located that the end of the upper reach of the screen 16 will be above the normal level of the liquid in the tank and the central portion of the upper reach will sag so that the central portion thereof will be substantially below the normal liquid level above the filter bed.

The upper reach of the screen 16 may be maintained in a suitable position by means of rollers 26 on which the upper reach rests, and the lower reach of the screen 16 may be kept above the bottom of the tank by means of additional rollers 26. Beneath the drum 17 at the discharge end of the endless screen 16 there is a low wall 27 above which the level of the filter liquid in the lower part of the tank should not rise, the top of the wall 27 being sloped downwardly toward the center of the tank so as to give as great an effective height of the wall as possible while accommodating the downwardly inclined portion of the lower reach of the screen 16. As illustrated, the liquid to be filtered is introduced through inlets 28 in the wall 13 of the tank 10 and the filtered liquid beneath the filter bed 15 is discharged from the tank through an outlet 29 over a weir 30.

In preparing the filter for operation, clean granular material, such as sand, is introduced through the hopper 25 and the motor 19 is operated to carry a layer of granular material along the upper reach of the belt to the other end thereof thus providing the required filter bed 15. Under some conditions the filter bed 15 may be used for a substantial period without movement of the screen 16 but when the granular material becomes contaminated to an extent which should not be exceeded, the motor 19 may be started and the filter bed gradually fed to the discharge end of the filter, fresh clean material being supplied through the hopper 25 while contaminated material is discharged at the other end of the tank.

The contaminated material or sand when discharged from the screen 16, falls into a compartment 31 between the wall 27 and the adjacent end 32 of the filter tank 10. At the bottom of the compartment 31, there may be provided a sump 33 to accommodate the lower end of a closed conveyor or elevator 34. The bottom of the compartment 31 is preferably arranged with sloping portions to direct the granular material to the lower end of the conveyor. The compartment 31 is filled with liquid to substantially the level of the filtered liquid in the main portion of the tank 10 and, as the granular material passes downwardly through the liquid to the sump, it is washed and cleaned, this cleaning operation being aided by the introduction of clean water through a pipe 35 and withdrawal of dirty water from a lower level through a pipe 36, the entrance of the pipe 36 being turned downwardly into the compartment 31 so that gravity will tend to prevent the heavier granular material from being drawn into the pipe 36 with the dirty water. The granular material which settles in the sump is picked up by the conveyor and when carried to the upper end thereof may be discharged from the conveyor in any desired manner, for example through a closed chute 37.

It will be obvious that, in order to obtain effective filtration, the liquid to be filtered must be prevented from flowing downwardly around the edges of the endless screen 16. Some means of effecting a liquid seal between the edges of the screen 16 and the side of the tank must therefore be provided. To this end the screen may be provided with flexible edges 38 of suitable material, such as rubber, engaging resilient members 39 suitably secured to the side walls of the tank 10 adjacent to the edges of the upper reach of the endless screen. Obviously the flexible edges 38 will be withdrawn from the resilient members 39 at the discharge end of the screen and brought back into effective relation therewith at the other end of the tank. As illustrated in Fig. 4 the resilient edges 38 will be bent upwardly by contact with the resilient members 39 when passing along the upper reach but may be flat with the rest of the screen in passing through the lower reach.

As illustrated in Fig. 1, the chute 37 delivers the cleaned granular material or sand into a hopper 25a at the adjacent end of the tank 11. The granular material in the hopper 25a will pass downwardly to the upper reach of an endless screen 16a and may be carried along thereby to provide a filter bed 15a corresponding with that in the tank 10. The screen 16a may be driven by an electric motor 19a acting through a speed reducer 20a in the same general manner as the screen 16 in tank 10. The contaminated granular material discharged from the screen 16a will fall into a tank 31a and after being cleaned in the same manner as at the other end of tank 1, will be lifted by means of a conveyor or elevator 34a and discharged through a downwardly extending chute 37a into the hopper 25 associated with the tank 10.

Liquid to be filtered may be introduced into the tank 11 through openings or inlets 28a and may after filtration, be discharged from the lower part of the tank 11 in any suitable manner. However, as illustrated in Figs. 1 and 2, the filtered liquid may be passed through openings 40 into the tank 10 and may be discharged over the weir 30 through the outlet 29.

Cleaning of granular material in the filter bed 15 may also be effected by means of an overhead cleaner 41 (Figs. 1 and 2) of any suitable construction, for example that disclosed in my co-pending application, Serial No. 231,585 filed September 24, 1938, on which was granted Patent No. 2,182,094 December 5, 1939. The action of the overhead cleaner 41 on the filter bed will be substantially the same as in the usual arrangement when the filter bed is stationary and the overhead cleaner travels. The cleaner 41 may be placed at any suitable location along the filter bed and, if substantialy all of the cleaning is to be done thereby, would preferably be located near the discharge end of the filter bed. The filter bed cleaner may also be used to supplement the cleaning effected in the pit at the discharge end of the traveling filter bed 15. An overhead cleaner 41a may also be provided for use with the traveling filter bed in tank 11.

It will be evident that only one tank 10 may be used and that the granular material after being cleaned in the compartment 31 at the left end of Figs. 1 and 2 may be removed from the liquid and, after transfer to the other end of the tank, dumped into the hopper 25.

It should also be understood that more than two tanks 10 and 11 may be used and that the granular material in each tank may, after contamination and later cleaning, be transferred to the next succeeding tank. This operation may be carried on until the granular material has been used in all tanks in succession, and may be repeated indefinitely.

It will be evident that according to the present invention a given amount of granular material may be used for continuous filtration without any break in the operation of filtration.

It should be understood that various features may be changed and that certain features may be used without others, without departing from the true spirit and scope of the invention.

What I claim is:

1. Apparatus for the filtration of liquid comprising a filter bed of granular material traveling across a solid bearing stream to retain solids as the liquid passes therethrough, said traveling filter bed having a substantially horizontal central portion and a stationary overhead cleaner arranged to engage the upper surface of the central portion of said filter bed and clean the granular material of the filter bed as the bed travels past the same, for the purpose of equalizing the filtration action of the bed from side to side of the stream.

2. Apparatus for the filtration of liquid, a traveling filter bed support carrying a filter bed of granular material across a stream of liquid to be filtered, means for cleaning said granular material while on said traveling filter bed support, means for discharging the granular material from the support after traveling across said stream, and means for cleaning the discharged granular material and restoring it to the filter bed support at the other side of the stream.

3. Apparatus for the filtration of liquid through filter beds of granular material comprising a plurality of filter units, each unit including a traveling filter bed support carrying a filter bed of granular material across a stream of liquid to be filtered and then discharging the granular material, and means for cleaning the granular material discharged from each unit and transferring it to the filter bed support of another unit whereby the granular material may be used in all of the units in succession.

4. Apparatus for the filtration of liquid through a filter bed of granular material, comprising two tanks side by side each divided by a low transverse wall near one end into a main compartment in which filtration is effected and a cleaning compartment in which used granular material is cleaned, the cleaning compartment in each tank being adjacent to the main compartment of the other tank, a rotatable support in each tank over said low transverse wall and a rotatable support at the other end of such tank, an endless screen passing around the rotatable supports in each tank and having an upper reach which sags so much that a filter bed supported thereon with raised ends will separate the liquid to be filtered from the filtered liquid below the bed, means for operating each endless screen so as to discharge contaminated granular material into the corresponding cleaning compartment, and means for transferring cleaned granular material from each cleaning compartment to the receiving end of the upper reach of the endless screen in the other tank.

5. Apparatus for the filtration of liquid through a filter bed of granular material, comprising a traveling filter bed support carrying a filter bed of granular material across a stream of liquid to be filtered and then discharging the granular material, a pit into which the granular material is discharged, means for cleaning the granular material in said pit comprising means for introducing clean liquid into said pit at one level and withdrawing dirty liquid at a lower level, and means for transferring clean granular material from said pit to said filter bed support preparatory to passage across said stream.

FRANCIS L. PRUYN.